UNITED STATES PATENT OFFICE.

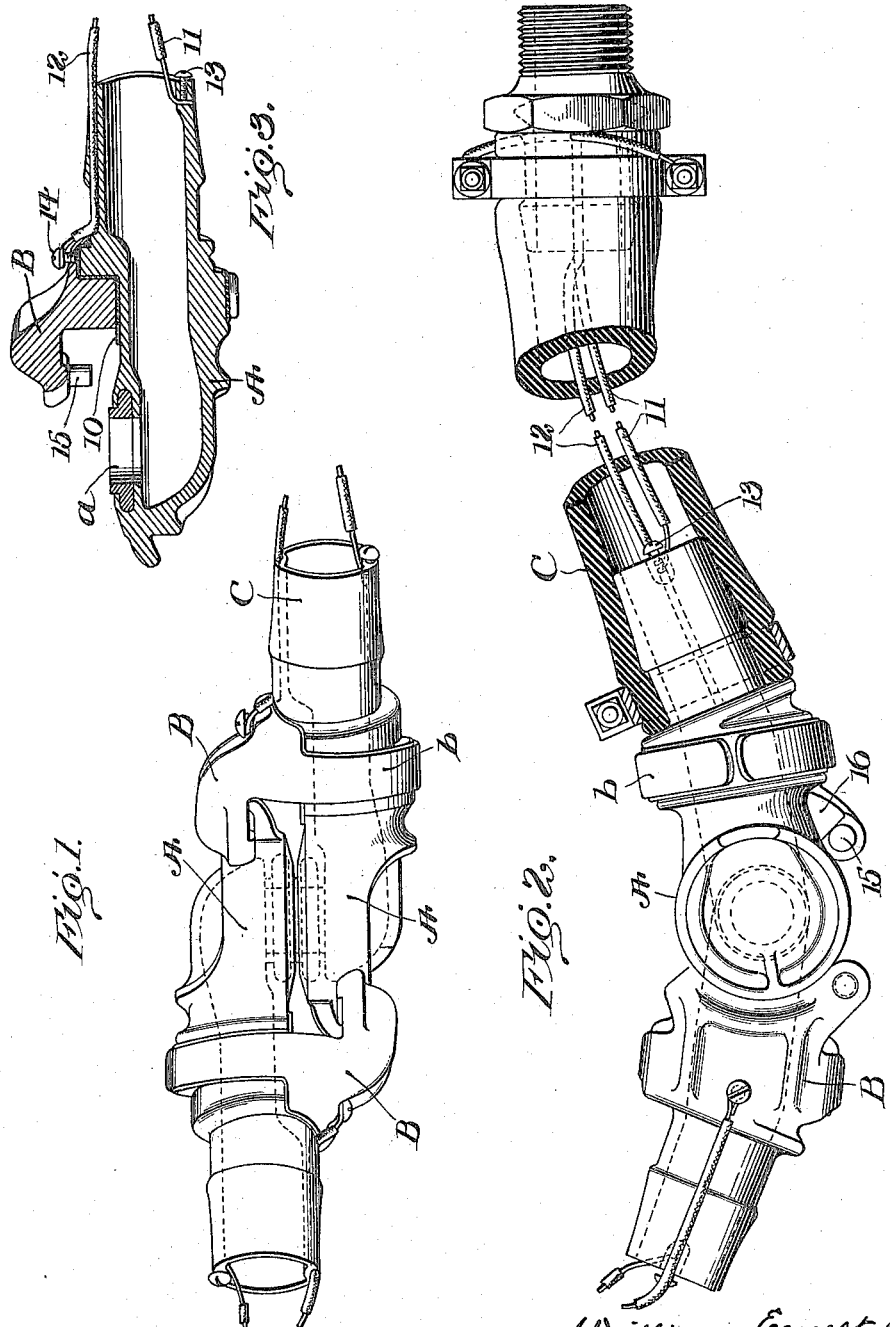

WILLIAM ERNEST BENN, OF McADAM JUNCTION, NEW BRUNSWICK, CANADA.

AIR-BRAKE-HOSE COUPLING.

1,166,407.  Specification of Letters Patent.  Patented Dec. 28, 1915.

Application filed December 12, 1914. Serial No. 876,869.

*To all whom it may concern:*

Be it known that I, WILLIAM ERNEST BENN, a citizen of the Dominion of Canada, residing at McAdam Junction, New Brunswick Province, and Dominion of Canada, have invented and discovered certain new and useful Improvements in Air-Brake-Hose Couplings, of which the following is a specification.

My said invention consists in an improved form of coupling members for the airline of railway trains, including means for connecting the two sides of an electric circuit through said coupling members, the terminal of each side of the circuit in each part of the coupling being arranged to contact and disconnect with its companion terminal in the other coupling section as the hose couplings are coupled and uncoupled, my present invention being a further development, or improvement, of the invention forming the subject matter of my application No. 875,575, filed January 30, 1913.

Referring to the accompanying drawings which are made a part hereof, and on which similar reference characters indicate similar parts, Figure 1 is a top view of an airline coupling of my improved form showing the parts in coupled position, Fig. 2 a side elevation of the same with the air brake hose attached at one end, and showing the air brake hose terminal, as at the end of the car, and Fig. 3 a detail section through one of the coupling members.

In said drawings the portions marked A represent the lower jaw or base part of each coupling member, B the outer jaw, and C the hose.

Each coupling member, when assembled, is of substantially the same general form and appearance as the ordinary standard air hose coupling, and is capable of use therewith. The two jaws A and B are, however, formed separately. The jaw A contains the passage for the air and terminates in an opening adapted to register with a similar opening in the other coupling member, said openings being each provided with rubber packing rings *a*, as is usual. The outer jaw B is formed to interlock with the formation of the lower jaw or base A, and has arms *b* adapted to surround said base A and firmly secure the part B thereto. Said arms *b* are of steel, or malleable iron, and when bent to position firmly secure the part B in place. A sheet of insulating material 10, such as mica, is interposed between the parts A and B so that one is electrically insulated from the other.

The electric circuit, comprising the wires 11 and 12, is adapted to run through the hose line C, as indicated in Fig. 2, one wire being secured to the part A by a binding post, or screw 13, and the other wire 12 passing through a groove or channel formed in the side of said part A, and being connected by a binding post 14 with the part B. That part of the wire 12 passing through the part A is covered by insulation so that the wire 12 is entirely insulated from said part A. Each of the parts B is formed with a lug 15 adapted to contact with another lug 16, formed on the part A and arranged to limit the turning of the two members of the coupling on each other at the proper coupled position, after they have been put together in the usual manner.

By this construction it will be seen that the two sides of the electric circuit are coupled as the airline is coupled from car to car, the part A of one coupling member connecting with the part B of the other coupling member to continue the circuit throughout the airline of the entire train.

As in my other application above referred to, this invention is intended for use in electric signal systems, its purpose being to in a practical and convenient manner utilize the airline for carrying the wires constituting the electric circuit in which the signaling apparatus may be installed.

Having thus fully described my said invention, what I claim as new and desire to secure by Letters Patent is:

1. A coupling for air brake hose sections comprising coupling members, each formed in two parts, one coupling jaw being formed on one part and the other on the other part, said two parts being firmly secured together with insulation between them, electric conductors forming two sides of an electric circuit with one secured to one of said parts, and the other secured to the other of said parts, substantially as set forth.

2. An air brake coupling comprising two coupling members each of which is formed in two parts, one jaw being formed on one part and one on the other, said two parts being insulated from each other and rigidly secured together, electric conductors secured one to one part and the other passing through a channel in said part and secured to the other part, substantially as set forth.

3. An air brake hose coupling comprising two coupling members, each coupling member being formed of separate sections secured together and insulated from each other, and electrical conductors, one electrically connected with one section and the other passing through said section and insulated therefrom and electrically secured to the other section, substantially as set forth.

In witness whereof, I have hereunto set my hand and seal at Brownville, Maine, this 8th day of December, A. D. nineteen hundred and fourteen.

WILLIAM ERNEST BENN. [L. S.]

Witnesses:
 HIRAM GERRISH,
 L. F. JOHNSON.

Copies of this patent may be obtained for five cents each, by addressing the "Commissioner of Patents, Washington, D. C."